(12) United States Patent
Lan

(10) Patent No.: US 11,617,059 B1
(45) Date of Patent: Mar. 28, 2023

(54) MOBILE DEVICE GEOGRAPHIC LOCATION DETERMINATION FOR EMERGENCY SERVICES

(71) Applicant: T-Mobile USA, Inc., Bellevue, WA (US)

(72) Inventor: Wei-Ming Lan, Newcastle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/334,595

(22) Filed: May 28, 2021

(51) Int. Cl.
*H04W 4/029* (2018.01)
*G01S 19/45* (2010.01)
*H04W 4/90* (2018.01)
*H04W 64/00* (2009.01)

(52) U.S. Cl.
CPC .......... *H04W 4/029* (2018.02); *G01S 19/45* (2013.01); *H04W 4/90* (2018.02); *H04W 64/00* (2013.01)

(58) Field of Classification Search
CPC ....... H04W 4/029; H04W 4/90; H04W 64/00; G01S 19/45
See application file for complete search history.

(56) References Cited

U.S. PATENT DOCUMENTS

| | | | |
|---|---|---|---|
| 8,185,128 B2 | 5/2012 | Lamba et al. | |
| 8,364,746 B2 | 1/2013 | Annamalai et al. | |
| 8,483,718 B2 | 7/2013 | Hwang | |
| 8,594,015 B2 | 11/2013 | Dunn et al. | |
| 8,718,670 B2 | 5/2014 | Ringland et al. | |
| 8,731,516 B2 | 5/2014 | Goodson et al. | |
| 8,811,939 B2 | 8/2014 | Edge et al. | |
| 8,886,221 B1 | 11/2014 | Zou | |
| 8,942,667 B2 | 1/2015 | Edge et al. | |
| 9,020,539 B2 | 4/2015 | Patrick | |
| 9,125,048 B2 | 9/2015 | Edge et al. | |
| 9,137,770 B2 | 9/2015 | Edge et al. | |
| 9,194,957 B2 | 11/2015 | Rowitch et al. | |
| 9,198,202 B2 | 11/2015 | Jones | |

(Continued)

FOREIGN PATENT DOCUMENTS

| | | |
|---|---|---|
| AU | 2004310995 C1 | 3/2009 |
| AU | 2009260228 B2 | 1/2013 |

(Continued)

*Primary Examiner* — Umair Ahsan
(74) *Attorney, Agent, or Firm* — Perkins Coie LLP (57) ABSTRACT

Systems and methods for providing timely location estimates when a user equipment initiates a call to an emergency number are disclosed. The system enables a user equipment and network nodes (e.g., eSMLC/LMF) to send multiple location responses instead of just one so that the PSAP can benefit from accurate location techniques in a timely manner. For example, when a user equipment is located in an outdoor environment, it can immediately send its A-GNSS location after meeting quality-of-service (QoS) criteria, and the eSMLC/LMF can forward the location estimate to the PSAP immediately without first waiting for all of the other location estimates. When location estimates become available from other technologies (e.g., E-CID, or DBH, or both), the eSMLC/LMF can send to the PSAP another location response for that technology. As a result, the PSAP can always have the most accurate and up-to-date location information available to timely and accurately respond to emergency calls.

20 Claims, 4 Drawing Sheets

(56) References Cited

U.S. PATENT DOCUMENTS

| | | | |
|---|---|---|---|
| 9,200,921 | B2 | 12/2015 | Iwuchukwu |
| 9,247,409 | B2 | 1/2016 | Tuck et al. |
| 9,507,027 | B2 | 11/2016 | Edge |
| 9,544,923 | B2 | 1/2017 | Gupta et al. |
| 9,578,459 | B2 | 2/2017 | Do et al. |
| 9,609,469 | B2 | 3/2017 | Khorashadi et al. |
| 9,736,627 | B2 | 8/2017 | Holm et al. |
| 9,756,664 | B2 | 9/2017 | Edge et al. |
| 9,820,100 | B1 | 11/2017 | Jarvis et al. |
| 9,835,710 | B2 | 12/2017 | Ganick et al. |
| 9,838,838 | B2 | 12/2017 | Rhee et al. |
| 9,942,710 | B2 | 4/2018 | Dowlatkhah et al. |
| 10,097,979 | B2 | 10/2018 | Edge et al. |
| 10,165,395 | B2 | 12/2018 | Edge et al. |
| 10,271,170 | B2 | 4/2019 | Dowlatkhah et al. |
| 10,382,906 | B2 | 8/2019 | Hooker et al. |
| 10,584,972 | B2 | 3/2020 | Frish et al. |
| 10,716,085 | B2 | 7/2020 | Annamalai et al. |
| 10,805,784 | B2 | 10/2020 | Edge et al. |
| 2007/0060097 | A1 | 3/2007 | Edge et al. |
| 2007/0135089 | A1 | 6/2007 | Edge et al. |
| 2007/0135134 | A1 | 6/2007 | Patrick |
| 2007/0213071 | A1 | 9/2007 | Hwang |
| 2008/0020774 | A1 | 1/2008 | Fancher et al. |
| 2009/0075677 | A1 | 3/2009 | Seger et al. |
| 2009/0177730 | A1 | 7/2009 | Annamalai et al. |
| 2009/0264136 | A1 | 10/2009 | Ische et al. |
| 2010/0067444 | A1 | 3/2010 | Faccin et al. |
| 2011/0269477 | A1* | 11/2011 | Annamalai .......... H04W 64/00 455/456.1 |
| 2012/0184287 | A1 | 7/2012 | Jovicic et al. |
| 2012/0202447 | A1 | 8/2012 | Edge et al. |
| 2013/0053056 | A1 | 2/2013 | Aggarwal et al. |
| 2013/0171958 | A1 | 7/2013 | Goodson et al. |
| 2013/0281110 | A1 | 10/2013 | Zelinka |
| 2014/0141804 | A1 | 5/2014 | Zelinka |
| 2014/0162589 | A1 | 6/2014 | Gupta et al. |
| 2014/0248901 | A1 | 9/2014 | Johnsson et al. |
| 2014/0349605 | A1 | 11/2014 | Edge et al. |
| 2014/0378164 | A1 | 12/2014 | Holm et al. |
| 2015/0031323 | A1 | 1/2015 | Hawkes et al. |
| 2015/0080024 | A1 | 3/2015 | Khorashadi et al. |
| 2015/0163651 | A1 | 6/2015 | Tuck et al. |
| 2016/0088584 | A1 | 3/2016 | Kudekar et al. |
| 2016/0143065 | A1 | 5/2016 | Gupta et al. |
| 2016/0150574 | A1 | 5/2016 | Edge et al. |
| 2016/0178724 | A1 | 6/2016 | Ganick et al. |
| 2016/0249193 | A1 | 8/2016 | Edge et al. |
| 2016/0334232 | A1 | 11/2016 | Zhuang |
| 2016/0360362 | A1 | 12/2016 | Do et al. |
| 2017/0039594 | A1 | 2/2017 | Shaw et al. |
| 2017/0041749 | A1 | 2/2017 | Dowlatkhah et al. |
| 2017/0325192 | A1 | 11/2017 | Annamalai et al. |
| 2018/0014338 | A1 | 1/2018 | Edge et al. |
| 2018/0041879 | A1 | 2/2018 | Hooker et al. |
| 2018/0184249 | A1 | 6/2018 | Dowlatkhah et al. |
| 2018/0234801 | A1* | 8/2018 | Jiang .................. H04W 4/025 |
| 2018/0245927 | A1 | 8/2018 | Frish et al. |
| 2019/0014462 | A1 | 1/2019 | Edge et al. |
| 2019/0246260 | A1 | 8/2019 | Edge et al. |
| 2020/0141739 | A1 | 5/2020 | Frish et al. |
| 2020/0252781 | A1 | 8/2020 | Edge |

FOREIGN PATENT DOCUMENTS

| | | |
|---|---|---|
| AU | 2013317995 A1 | 5/2015 |
| AU | 2015354710 A1 | 5/2017 |
| AU | 2015354709 B2 | 10/2018 |
| AU | 2019217288 A1 | 7/2020 |
| CA | 2762231 A1 | 3/2007 |
| CA | 2619642 A1 | 4/2007 |
| CA | 2726192 A1 | 12/2009 |
| CA | 2617783 C | 7/2012 |
| CA | 2622751 C | 5/2016 |
| CA | 2546875 C | 7/2016 |
| CN | 101273615 B | 1/2013 |
| CN | 102667519 B | 9/2014 |
| CN | 102970655 | 3/2016 |
| CN | 103477664 B | 12/2016 |
| CN | 107005802 A | 8/2017 |
| CN | 107071891 A | 8/2017 |
| CN | 107113566 A | 8/2017 |
| CN | 105556328 B | 5/2018 |
| CN | 104956703 B | 9/2018 |
| CN | 108885119 A | 11/2018 |
| CN | 109313030 A | 2/2019 |
| CN | 111971981 A | 11/2020 |
| EP | 1273183 A2 | 1/2003 |
| EP | 1695570 A2 | 8/2006 |
| EP | 1925182 A2 | 5/2008 |
| EP | 1968243 A1 | 9/2008 |
| EP | 2193510 A1 | 6/2010 |
| EP | 2673971 A2 | 12/2013 |
| EP | 2763440 A1 | 8/2014 |
| EP | 2641380 B1 | 12/2014 |
| EP | 2818011 A1 | 12/2014 |
| EP | 1938488 B1 | 9/2015 |
| EP | 2932770 A2 | 10/2015 |
| EP | 3052959 A1 | 8/2016 |
| EP | 3225041 A1 | 10/2017 |
| EP | 3225042 A1 | 10/2017 |
| EP | 3347677 A1 | 7/2018 |
| EP | 3472559 A1 | 4/2019 |
| EP | 2453638 B1 | 11/2019 |
| EP | 3750336 A1 | 12/2020 |
| HK | 1122444 A1 | 5/2013 |
| HK | 1175852 A1 | 7/2015 |
| IN | 201727013063 A | 6/2017 |
| IN | 202027028971 | 10/2020 |
| JP | 2014507902 A | 3/2014 |
| JP | 5745101 B2 | 7/2015 |
| JP | 2015181242 A | 10/2015 |
| JP | 6117274 B2 | 4/2017 |
| JP | 6805143 B2 | 12/2020 |
| KR | 20060096162 A | 9/2006 |
| KR | 20080054380 A | 6/2008 |
| KR | 20080057282 A | 6/2008 |
| KR | 20080085076 A | 9/2008 |
| KR | 20080108522 A | 12/2008 |
| KR | 100976109 B1 | 8/2010 |
| KR | 20110002096 A | 1/2011 |
| KR | 20110017930 A | 2/2011 |
| KR | 101022997 B1 | 3/2011 |
| KR | 101030627 B1 | 4/2011 |
| KR | 101042730 B1 | 6/2011 |
| KR | 20120091085 A | 8/2012 |
| KR | 20130125811 A | 11/2013 |
| KR | 101375475 B1 | 4/2014 |
| KR | 20150003371 A | 1/2015 |
| KR | 101498967 B1 | 3/2015 |
| KR | 101503903 B1 | 3/2015 |
| KR | 101547034 B1 | 8/2015 |
| KR | 20150095784 A | 8/2015 |
| KR | 20160058134 A | 5/2016 |
| KR | 20170008328 A | 1/2017 |
| KR | 20170091598 A | 8/2017 |
| KR | 20170091600 A | 8/2017 |
| KR | 101801131 B1 | 11/2017 |
| KR | 101825898 B1 | 2/2018 |
| KR | 101913535 B1 | 10/2018 |
| RU | 2002129896 A | 3/2004 |
| RU | 2006136984 A | 4/2008 |
| RU | 2008107997 A | 9/2009 |
| RU | 2008114499 A | 10/2009 |
| RU | 2391792 C2 | 6/2010 |
| RU | 2396733 C2 | 8/2010 |
| RU | 2491752 C2 | 8/2013 |
| RU | 2507718 C1 | 2/2014 |
| TW | I342140 B | 5/2011 |
| TW | I348554 B | 9/2011 |
| TW | 201244510 A | 11/2012 |
| TW | I495367 B | 8/2015 |
| TW | I583221 B | 5/2017 |

(56) References Cited

FOREIGN PATENT DOCUMENTS

| | | |
|---|---|---|
| TW | I592806 B | 7/2017 |
| TW | 201736863 A | 10/2017 |
| TW | 201935943 A | 9/2019 |
| WO | 2002003718 | 1/2002 |
| WO | 2005055494 A2 | 6/2005 |
| WO | 2007035736 A2 | 3/2007 |
| WO | 2009129507 A2 | 10/2009 |
| WO | 2012109154 A2 | 8/2012 |
| WO | 2014093533 A2 | 6/2014 |
| WO | 2017042672 A1 | 3/2017 |
| WO | 2017045109 A1 | 3/2017 |
| WO | 2017045461 A1 | 3/2017 |
| WO | 2017218054 A1 | 12/2017 |

\* cited by examiner

MOBILE DEVICE GEOGRAPHIC LOCATION DETERMINATION FOR EMERGENCY SERVICES

BACKGROUND

Enhanced 911, E-911, or E911 is a system used in North America to automatically provide the caller's location to 911 dispatchers. An incoming 911 call is routed to a public safety answering point (PSAP), which is a call center operated by the local government. At the PSAP, the call is answered by a specially trained official known as a 911 dispatcher. The dispatcher's computer receives information from the telephone company about the physical address (for landlines) or geographic coordinates (for wireless) of the caller. This information is used to dispatch police, fire, medical, and other services as needed. For example, in addition to the voice transmission, the network also transmits an automatic number identification (ANI) associated with the current call. The 911 operator (or the operator's computer) at the PSAP searches an automatic location identification (ALI) database for the ANI to find the caller's relevant location.

The billing address associated with a mobile device is not necessarily considered the location to which emergency responders should be sent, since the device is portable. This means that locating the caller is more difficult. To locate a mobile telephone geographically, there are generally the following three approaches: Enhanced Cell ID (E-CellID, or E-CID); global navigation satellite systems (GNSS) or assisted GNSS (A-GNSS/AGPS); and device-based hybrid (DBH) approach. DBH location uses a mix of location methods available to the device including crowd-sourced Wi-Fi, A-GNSS, and handset-based sensors. It also includes an associated uncertainty estimate reflective of the quality of the returned location.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Today's E911 location technologies include E-CID, A-GNSS, and DBH. Each technology has its strengths and weaknesses under different environments (e.g., indoors, outdoors, etc.). And the availability of the location estimate also varies from environment to environment. For example, A-GNSS is more accurate in outdoor environments than in indoor environments and can be available much more quickly outdoors than indoors. On the other hand, DBH based on Wi-Fi can be available indoors when multiple Wi-Fi access points can be detected, but it is not as accurate outdoors.

When a user dials an emergency number (e.g., 911), it is important for a PSAP to determine an accurate location of the user to respond in a timely manner. However, current E911 technologies suffer from several drawbacks due to which they are unable to determine an accurate and timely location of a user dialing an emergency number. For instance, during an emergency call in an LTE or 5G SA network, a user equipment generates an A-GNSS and DBH location estimate and provides E-CID measurements to a node in a telecommunications network. The network node will then pick a location estimate with the lowest uncertainty to send to the Gateway Mobile Location Center (GMLC), which contains functionality required to support location-based service (LBS). Currently, 3GPP allows only two location responses from the user equipment to eSMLC/LMF, and allows only one location response from eSMLC/LMF to GMLC. As a result, eSMLC/LMF must wait for all three of the location estimates—E-CID, A-GNSS, and DBH—to arrive before it can decide which one to send to GMLC. However, since the availability of the location estimate varies from environment to environment, this results in delays when providing an accurate location to the PSAP.

Figure 2:
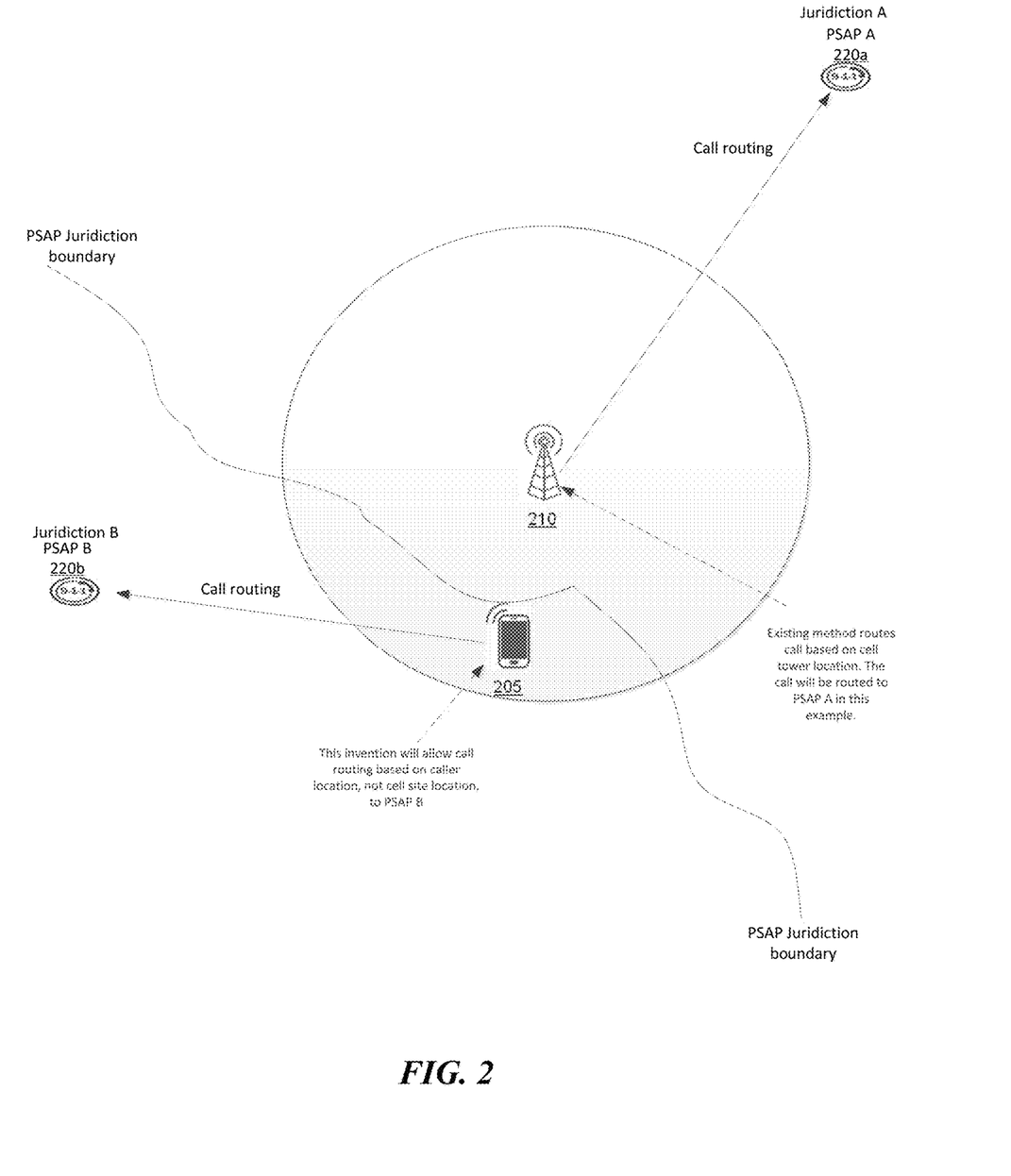
FIG. 2 is an environment diagram that illustrates emergency call routing according to some implementations of the disclosed system.

Further, one of the NG911 requirements imposed on wireless service providers by the Federal Communications Commission is that the wireless service provider must route the emergency call to the PSAP that has jurisdiction over the location where the call was initiated instead of to the neighboring PSAP that has no jurisdiction over the location where the call was initiated. Routing the call to the correct PSAP could speed up the time it takes for a first responder to provide urgently needed help to people in need, without causing confusion. In most circumstances, while a user equipment can typically determine its precise location within a few seconds (e.g., indoors by DBH methods and outdoors by A-GNSS methods), the current 3GPP standard does not provide mechanisms for timely and reliable delivery of the caller's location to the telecommunications network before the network needs to set up and connect the E911 call. As a result, using current methods, an E911 call is typically routed to the PSAP based on the cell tower's location rather than the caller's more precise location. For example, as illustrated in FIG. 2, existing methods will route a call from user equipment 205 to PSAP A 220a based on the location of the cell tower 210.

To solve these and other problems with current E911 technologies, the inventors have conceived and reduced to practice systems and methods for providing timely location estimates when a user equipment initiates a call to an emergency number. The system enables a user equipment and network nodes (e.g., eSMLC/LMF) to send multiple location responses instead of just one so that the PSAP can benefit from accurate location techniques in a timely manner. For example, when a user equipment is located in an outdoor environment, it can immediately send its A-GNSS location after meeting quality-of-service (QoS) criteria, and the eSMLC/LMF can forward the location estimate to the core network immediately without first waiting for all of the other location estimates. When location estimates become available from other technologies (e.g., E-CID, or DBH, or both), the eSMLC/LMF can send to the core network another location response for that technology. Similarly, when a user equipment is located in an indoor environment, it can immediately send its DBH location, and the eSMLC/LMF can forward the location estimate to the core network immediately without first waiting for all of the other location estimates. When location estimates become available from other technologies (e.g., A-GNSS, or E-CID, or both), the eSMLC/LMF can send to the PSAP another location response for that technology. As a result, the service provider can always have the most accurate and up-to-date location information available to timely and accurately respond to emergency calls. For example, as illustrated in FIG. 2, using the disclosed system, a service provider can route the E911 call to PSAP B 220b based on the caller's actual location instead of the closest cell site location.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
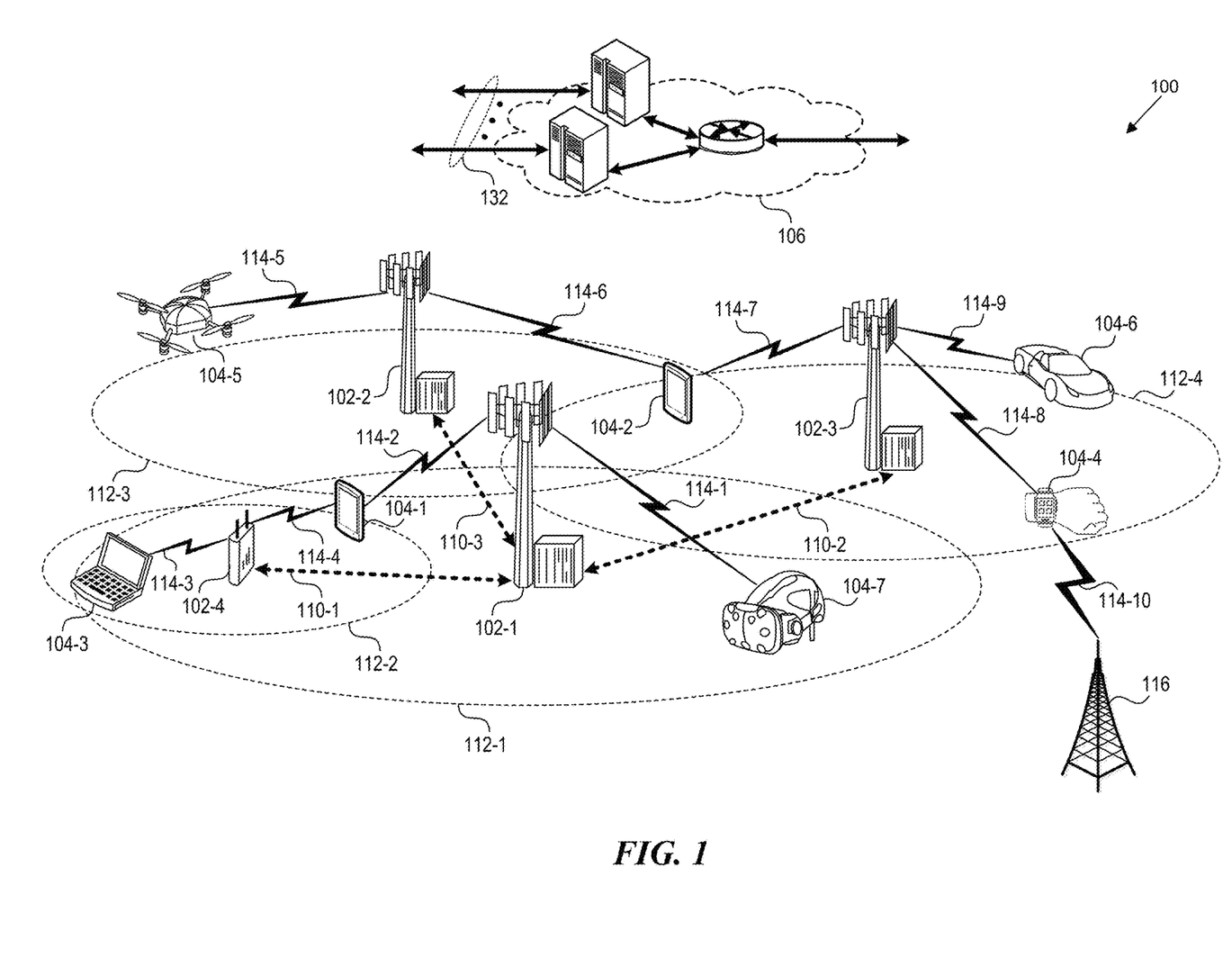
FIG. 1 is a block diagram that illustrates a wireless communications system.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNBs is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid Automatic Repeat Request (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the network 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), or a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home, a portable gaming console, or a wirelessly connected sensor that provides data to a remote server over a network.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-10 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) operation (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Timely Emergency Message Routing System

Figure 3:
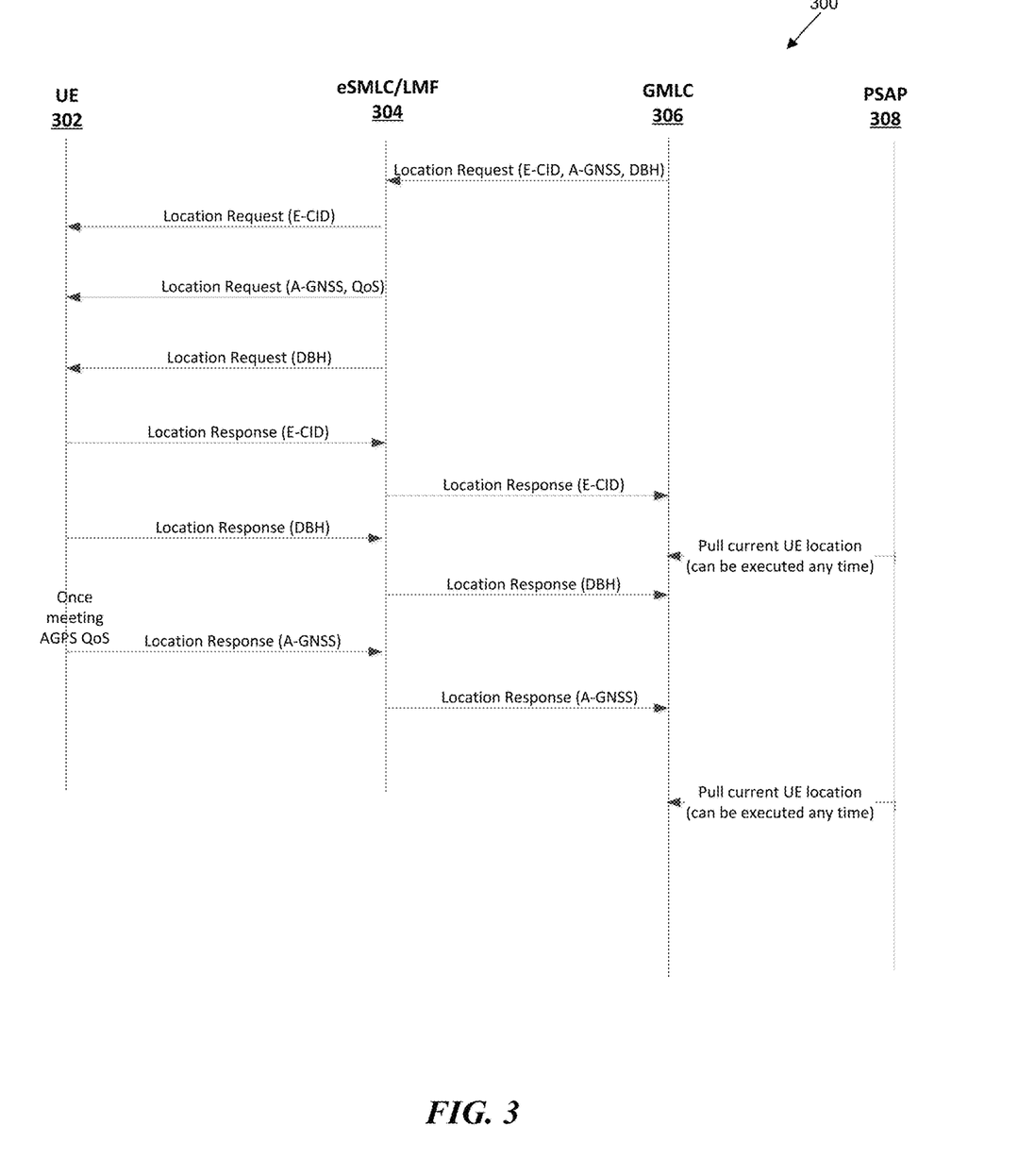
FIG. 3 is a flowchart that illustrates a process performed by the disclosed system in some implementations.

FIG. 3 is a flowchart that illustrates a process 300 performed by the disclosed system in some implementations. Process 300 begins when a telecommunications service network receives an emergency notification (e.g., an E911 call, emergency text message, emergency app alert, etc.) from a user equipment 302. Upon receiving the emergency notification, a network node in the telecommunications network 306 (e.g., a Gateway Mobile Location Center (GMLC)) sends a location request to another network node 304 in the telecommunications network (e.g., Serving Mobile Location Center (SMLC), Enhanced Serving Mobile Location Center (eSMLC), Location Management Function (LMF), etc.). In some implementations, one or more of the following network nodes are collectively referred to as a "location management server": GMLC, SMLC/eSMLC/LMF, and so on. The eSMLC/LMF 304 transmits one or more location requests to the user equipment 302 to gather estimate(s) of the user equipment's location. The location estimates can be gathered using different location mechanisms, such as Enhanced Cell ID (E-CID), global navigation satellite systems (GNSS), assisted GNSS (A-GNSS), or device-based hybrid (DBH) approach. In some implementations, the eSMLC/LMF 304 selects one or more location mechanisms based on one or more factors, such as default, location history of the user equipment, last known location of the user equipment, time of day, user preferences, and so on. For example, based on a last known location of the user equipment being indoors, the eSMLC/LMF 304 selects the DBH location mechanism because it typically results in a more accurate location estimate in indoor settings. As another example, when the last few location estimates of the user equipment were outdoors, the eSMLC/LMF 304 selects the A-GNSS location mechanism because it is more accurate in outdoor settings and can be available more quickly than other location mechanisms.

For each of the selected location mechanisms, the eSMLC/LMF 304 transmits location requests to the user equipment 302. For example, the eSMLC/LMF 304 sends a first location request for a first location estimate using the E-CID location mechanism; sends a second location request for a second location estimate using the A-GNSS location mechanism and an expected quality-of-service (QoS) indicator value; and sends a third location request for a third location estimate using the DBH location mechanism. In due course, the eSMLC/LMF 304 receives, from the user equipment 302, one or more location responses corresponding to the location requests. The location responses can be received in the order the location requests were sent, or out of order. For example, the eSMLC/LMF 304 receives, from the user equipment 302, a first message comprising a first location estimate using the E-CID location mechanism; a second message comprising a second location estimate using the DBH location mechanism; and a third message comprising a third location estimate using the A-GNSS location mechanism, when the associated QoS threshold is met.

The eSMLC/LMF 304 transmits the received location estimates to the GMLC 306. In some implementations, the eSMLC/LMF 304 transmits the received location estimates to the GMLC 306 as it receives them. In other implementations, the eSMLC/LMF 304 transmits the received location estimates to the GMLC 306 after waiting for a threshold time period and/or after it has received a threshold number of location estimates. Upon receiving a first location estimate value, the GMLC 306 updates the current location value of the user equipment 302 to be the received location estimate value. Upon receiving subsequent location estimate values, the GMLC 306 compares an uncertainty indicator value associated with the received location estimate. When the uncertainty indicator value associated with the received location estimate is lower than an uncertainty indicator associated with the currently stored location of the user equipment, the GMLC 306 updates the current location value of the user equipment to be the received location estimate value. In this manner, the location management server at the core network maintains the most up-to-date and accurate location information for a user equipment. The location management server (e.g., the GMLC) uses the current location value of the user equipment to identify the PSAP 308 closest to the actual location of the user equipment (rather than the PSAP closest to the cell tower via which the user equipment is communicating). The location management server (e.g., the GMLC) forwards the received emergency message to the identified PSAP 308. In some implementations, the PSAP 308 can pull the current location of the user equipment at any time. Upon receiving the PSAP request, the GMLC 306 sends the current location value of the user equipment to the PSAP 308. In this way, the GMLC can always send the most currently accurate value of the user's current location to the PSAP.

Computer System

Figure 4:
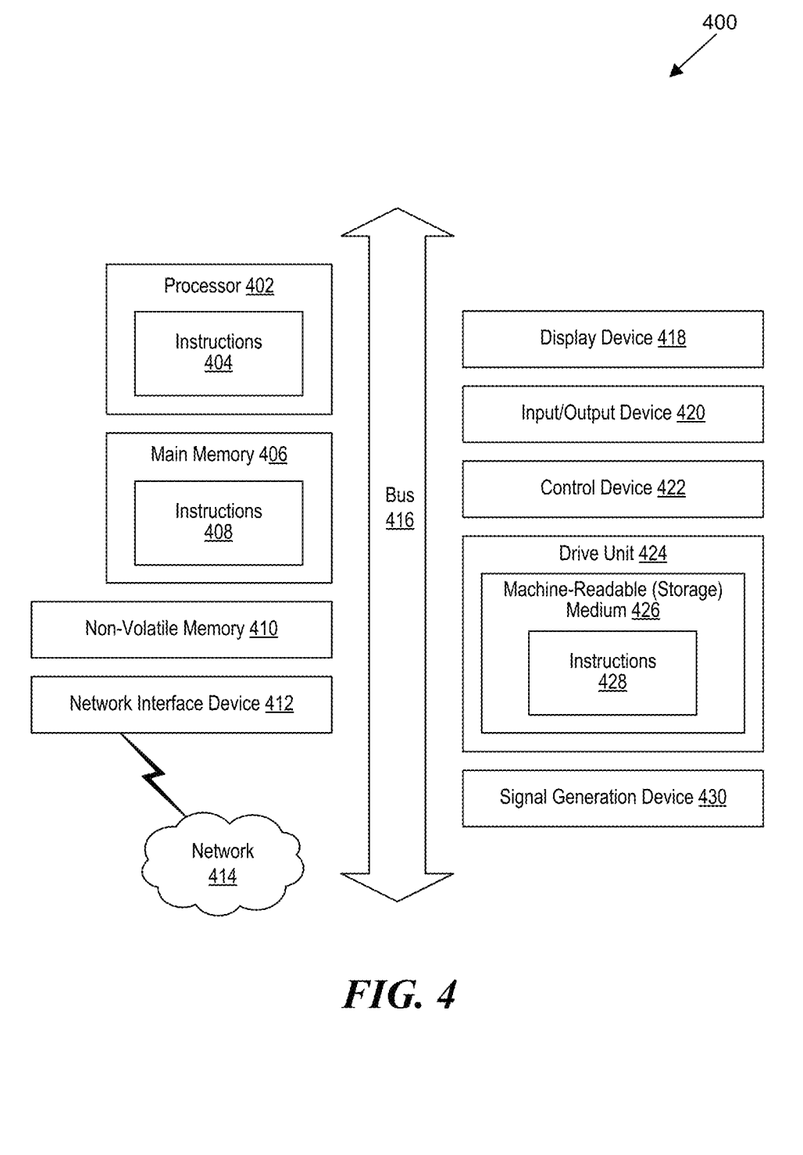
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, a video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computer system 400 can share a similar architecture as that of a server computer, personal computer (PC), tablet computer, mobile telephone, game console, music player, wearable electronic device, network-connected ("smart") device (e.g., a television or home assistant device), AR/VR system (e.g., head-mounted display), or any electronic device capable of executing a set of instructions that specify action(s) to be taken by the computer system 400. In some implementations, the computer system 400 can be an embedded computer system, a system-on-chip (SOC), a single-board computer system (SBC), or a distributed system such as a mesh of computer systems, or it can include one or more cloud components in one or more networks. Where appropriate, one or more computer systems 400 can perform operations in real time, in near real time, or in batch mode.

The network interface device 412 enables the computer system 400 to mediate data in a network 414 with an entity that is external to the computer system 400 through any communication protocol supported by the computer system 400 and the external entity. Examples of the network interface device 412 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 406, non-volatile memory 410, machine-readable (storage) medium 426) can be local, remote, or distributed. Although shown as a single medium, the machine-readable (storage) medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computer system 400. The machine-readable (storage) medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computer system 400 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention, for example as described in co-pending application Ser. No. 17/387,789 filed Jul. 28, 2021, titled "Emergency Alert Systems and Methods for Differently Abled Persons" and Ser. No. 17/332,937 filed May 27, 2021, titled "Device-Based Timely Emergency Call Routing", the contents of which are incorporated by reference in their entireties.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

I claim:

1. At least one computer-readable storage medium, excluding transitory signals and carrying instructions, which, when executed by at least one data processor of a system, causes the system to:
   receive an emergency call from a mobile device;
   transmit, from a location management server of a telecommunications service provider, requests for two or more location estimates of a same location of a mobile device, the two or more location estimates using different location mechanisms;
   receive, at the location management server, a first message from the mobile device, wherein the first message comprises a first location estimate of two or more location estimates, the first location estimate using a first location mechanism;
   update a current location of the mobile device to be the received first location estimate prior to reception of a second location estimate of the two or more location estimates and a third location estimate of the two or more location estimates, the second location estimate using a second location mechanism and the third location estimate using a third location mechanism;
   receive, at the location management server, a second message from the mobile device,
   wherein the second message comprises the second location estimate;
   when an uncertainty indicator value associated with the second location estimate is lower than an uncertainty indicator value of the current location of the mobile device, update the current location of the mobile device to be the received second location estimate prior to reception of the third location estimate;
   receive, at the location management server, a third message from the mobile device, wherein the third message comprises the third location estimate;
   when an uncertainty indicator value associated with the third location estimate is lower than the uncertainty indicator value of the current location of the mobile device, update the current location of the mobile device to be the received third location estimate;
   identify a closest public safety answering point (PSAP) using the current location of the mobile device; and forward the received emergency call to the identified closest PSAP.

2. The at least one computer-readable storage medium of claim 1, wherein the location management server comprises one or more of: Enhanced Serving Mobile Location Center (eSMLC), Location Management Function (LMF), or Gateway Mobile Location Center (GMLC).

3. The at least one computer-readable storage medium of claim 1, wherein the instructions, when executed by the at least one data processor of the system, further cause the system to:
transmit, from the location management server to the mobile device, a first request to provide the first location estimate using the first location mechanism;
transmit, from the location management server to the mobile device, a second request to provide the second location estimate using the second location mechanism; and
transmit, from the location management server to the mobile device, a third request to provide the third location estimate using the third location mechanism.

4. The at least one computer-readable storage medium of claim 1, wherein the instructions, when executed by the at least one data processor of the system, further cause the system to:
receive, at the location management server, a request to provide the current location of the mobile device.

5. The at least one computer-readable storage medium of claim 1, wherein the instructions, when executed by the at least one data processor of the system, further cause the system to:
receive, at the location management server, a request to provide the current location of the mobile device;
in response to the request to provide the current location of the mobile device, transmit the current location of the mobile device.

6. The at least one computer-readable storage medium of claim 1, wherein the first location mechanism, the second location mechanism, or the third location mechanism is one of: Enhanced Cell ID, global navigation satellite systems (GNSS), assisted GNSS (A-GNSS), or device-based hybrid (DBH) approach.

7. A computer-implemented method to enable timely emergency messages routing in a telecommunications network, the method comprising:
receiving an emergency message from a user equipment;
transmit, from a location management server of a telecommunications service provider,
requests for two or more location estimates of a same location of the user equipment, the two or more location estimates using different location mechanisms;
receiving, at the location management server of a telecommunications service provider, a set of messages from the user equipment,
wherein each location update message in the set of messages comprises a location estimate of the same location of the user equipment using a different location mechanism;
for each location update message in the received set of messages:
when an uncertainty indicator value associated with a location estimate of the location update message is lower than an uncertainty indicator value of a current location of the user equipment and without waiting for reception of all of the received set of messages, updating the current location of the user equipment to be the location estimate;

identifying a closest public safety answering point (PSAP) using the current location of the user equipment; and
forwarding the received emergency message to the identified closest PSAP.

8. The method of claim 7, wherein the location management server comprises one or more of: Enhanced Serving Mobile Location Center (eSMLC), Location Management Function (LMF), or Gateway Mobile Location Center (GMLC).

9. The method of claim 7, further comprising:
transmitting, from the location management server to the user equipment, a set of requests to provide a current location estimate of the user equipment.

10. The method of claim 7, further comprising:
receiving, at the location management server, a request to provide the current location of the user equipment.

11. The method of claim 7, further comprising:
receiving, at the location management server, a request to provide the current location of the user equipment; and
in response to the request to provide the current location of the user equipment, transmitting the current location of the user equipment.

12. The method of claim 7, further comprising:
receiving, at the location management server, a request to provide the current location of the user equipment using an identified location mechanism; and
in response to the request to provide the current location of the user equipment, transmitting a location of the user equipment corresponding to the identified location mechanism.

13. The method of claim 7, wherein the location mechanism is one of: Enhanced Cell ID, global navigation satellite systems (GNSS), assisted GNSS (A-GNSS), or device-based hybrid (DBH) approach.

14. A system comprising:
at least one hardware processor; and
at least one non-transitory memory storing instruction, which, when executed by the at least one hardware processor, causes the system to:
receive an emergency message from a user equipment;
transmit, from a location management server of a telecommunications service provider, requests for two or more location estimates of a same location of the user equipment, the two or more location estimates using different location mechanisms;
receive, at the location management server of a telecommunications service provider, a set of messages from the user equipment,
wherein each location update message in the set of messages comprises a location estimate of the same location of the user equipment using a different location mechanism;
for each location update message in the received set of messages:
when an uncertainty indicator value associated with a location estimate of the location update message is lower than an uncertainty indicator value of a current location of the user equipment and without waiting for reception of all of the received set of messages, update the current location of the user equipment to be the location estimate;
identify a closest public safety answering point (PSAP) using the current location of the user equipment; and
forward the received emergency message to the identified closest PSAP.

15. The system of claim 14, wherein the location management server comprises one or more of: Enhanced Serving Mobile Location Center (eSMLC), Location Management Function (LMF), or Gateway Mobile Location Center (GMLC).

16. The system of claim 14, wherein the system is further configured to: transmit, from the location management server to the user equipment, a set of requests to provide a current location estimate of the user equipment.

17. The system of claim 14, wherein the system is further configured to:
receive, at the location management server, a request to provide the current location of the user equipment.

18. The system of claim 14, wherein the system is further configured to:
receive, at the location management server, a request to provide the current location of the user equipment; and
in response to the request to provide the current location of the user equipment, transmit the current location of the user equipment.

19. The system of claim 14, wherein the system is further configured to:
receive, at the location management server, a request to provide the current location of the user equipment using an identified location mechanism; and
in response to the request to provide the current location of the user equipment, transmit a location of the user equipment corresponding to the identified location mechanism.

20. The system of claim 14, wherein the location mechanism is one of: Enhanced Cell ID, global navigation satellite systems (GNSS), assisted GNSS (A-GNSS), or device-based hybrid (DBH) approach.

* * * * *